(12) United States Patent
Scott

(10) Patent No.: US 9,090,343 B2
(45) Date of Patent: Jul. 28, 2015

(54) ROTOR BLADE COMPONENT COOLING

(75) Inventor: Mark W. Scott, Bethany, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 786 days.

(21) Appl. No.: 13/272,781

(22) Filed: Oct. 13, 2011

(65) Prior Publication Data

US 2013/0094959 A1     Apr. 18, 2013

(51) Int. Cl.
  *B64C 27/473*   (2006.01)
  *B64C 27/72*    (2006.01)

(52) U.S. Cl.
  CPC ....... *B64C 27/473* (2013.01); *B64C 2027/7205* (2013.01); *Y02T 50/34* (2013.01)

(58) Field of Classification Search
  CPC ............... B46C 27/473; B46C 2027/7205; Y02T 50/134
  USPC ...... 416/1, 90 R, 91, 92, 90 A, 231 R, 231 B, 416/97 R, 95, 23, 156; 244/17.11, 17.23, 244/17.25
  See application file for complete search history.

(56) References Cited

U.S. PATENT DOCUMENTS

| | | | | |
|---|---|---|---|---|
| 2,156,133 A * | 4/1939 | Troller | ............................ | 416/91 |
| 2,476,002 A * | 7/1949 | Stalker | ............................ | 416/23 |
| 2,516,489 A * | 7/1950 | Stalker | ............................ | 416/21 |
| 2,625,997 A * | 1/1953 | Doak | ............................ | 416/23 |
| 2,638,990 A * | 5/1953 | Pitcairn | ........................ | 416/90 R |
| 3,588,273 A * | 6/1971 | Kizilos | ............................ | 416/42 |
| 3,795,375 A * | 3/1974 | Lemnios | .................... | 244/17.27 |
| 3,966,145 A * | 6/1976 | Wiesner | ..................... | 244/17.11 |
| 4,045,146 A * | 8/1977 | Crimi | ............................. | 416/1 |
| 4,655,685 A * | 4/1987 | Fradenburgh | ................ | 416/90 A |
| 5,387,083 A * | 2/1995 | Larson et al. | .................. | 416/23 |
| 5,639,215 A * | 6/1997 | Yamakawa et al. | ............ | 416/23 |
| 5,720,431 A   | 2/1998 | Sellers et al. | | |
| 5,791,601 A * | 8/1998 | Dancila et al. | ................ | 244/207 |
| 6,109,870 A * | 8/2000 | Yamakawa et al. | ............ | 416/23 |
| 6,152,692 A * | 11/2000 | Aubry | ............................ | 416/24 |
| 6,168,379 B1 * | 1/2001 | Bauer | ............................ | 416/23 |
| 6,196,796 B1 * | 3/2001 | Lozyniak et al. | ............... | 416/24 |
| 6,203,269 B1 * | 3/2001 | Lorber et al. | ................. | 415/115 |
| 6,231,013 B1 * | 5/2001 | Jaenker | ........................ | 244/215 |
| 6,273,681 B1 * | 8/2001 | Yamakawa et al. | ............ | 416/23 |
| 6,322,324 B1 * | 11/2001 | Kennedy et al. | .................. | 416/1 |
| 6,499,690 B1 * | 12/2002 | Katayama et al. | .......... | 244/17.11 |
| 6,513,762 B2 * | 2/2003 | Fink et al. | ..................... | 244/215 |
| 6,530,542 B2 * | 3/2003 | Toulmay | .................... | 244/17.13 |
| 7,217,091 B2 * | 5/2007 | LeMieux | ........................ | 416/95 |
| 7,234,921 B2 * | 6/2007 | Shchukin et al. | ................. | 416/1 |

(Continued)

FOREIGN PATENT DOCUMENTS

WO      WO 2010023286 A2 *  3/2010

*Primary Examiner* — Nathaniel Wiehe
*Assistant Examiner* — Wayne A Lambert
(74) *Attorney, Agent, or Firm* — Cantor Colburn LLP

(57) ABSTRACT

A rotor blade for a rotary wing aircraft includes a component bay located substantially enclosed in the rotor blade and one or more components positioned in the component bay. An airflow is located at the component bay and an airflow outlet is located at the component bay radially outboard of the airflow inlet. The airflow inlet and airflow outlet allow a continuous airflow through the component bay via centrifugal forces of rotation of the rotor blade, the continuous airflow cooling the one or more components disposed at the component bay.

15 Claims, 3 Drawing Sheets

(56) References Cited

U.S. PATENT DOCUMENTS

| | | | |
|---|---|---|---|
| 7,354,247 B2 * | 4/2008 | Bonnet | 416/90 R |
| 7,677,868 B2 | 3/2010 | Chaudhry et al. | |
| 7,785,071 B1 * | 8/2010 | Liang | 416/97 R |
| 2007/0025852 A1 * | 2/2007 | Camhi et al. | 416/97 R |
| 2007/0116567 A1 * | 5/2007 | Luetze | 416/97 R |
| 2008/0145220 A1 * | 6/2008 | Yeh et al. | 416/23 |
| 2011/0103953 A1 * | 5/2011 | Haans et al. | 416/31 |
| 2011/0229320 A1 * | 9/2011 | Hancock et al. | 416/1 |

\* cited by examiner

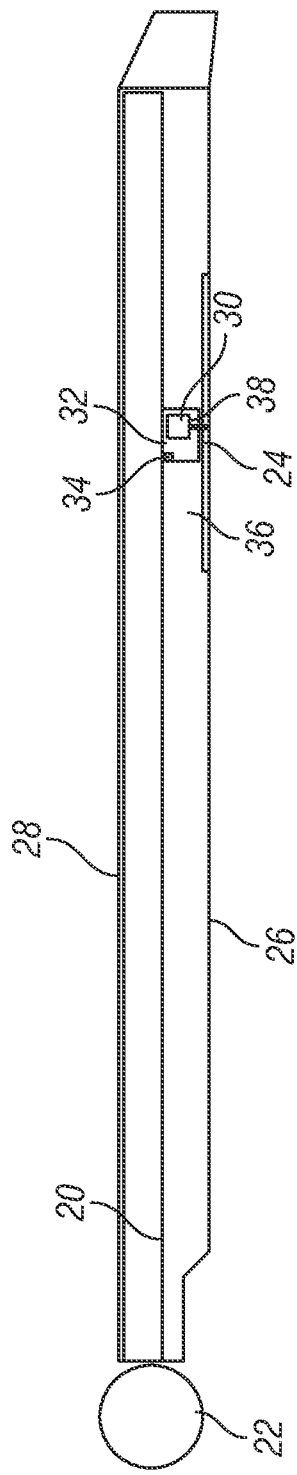
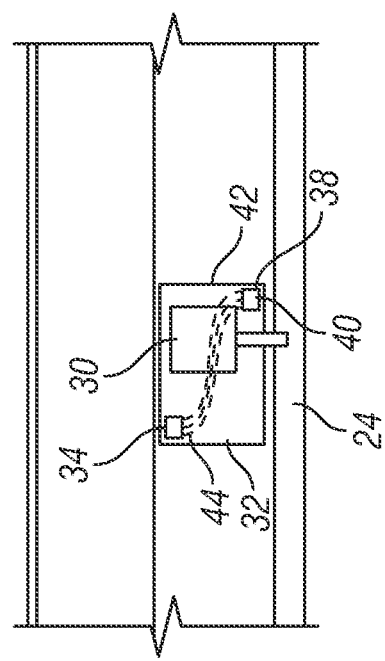

ROTOR BLADE COMPONENT COOLING

GOVERNMENT RIGHTS STATEMENT

This invention was made with Government support under contract HR0011-10-9-0002 awarded by DOT/FAA William J. Hughes Technical Center. The Government has certain rights in this invention.

BACKGROUND OF THE INVENTION

The subject matter disclosed herein relates to rotors. More specifically, the subject matter disclosed herein relates to cooling of ancillary components of rotor blades.

Some rotors, for example, some main rotors for helicopters, are adaptive rotors having rotor blades which can change operational state. This is often accomplished by devices in the rotor blades which change the diameter, sweep, chord, tip shape of the blades, and/or other blade parameters. Airfoil sections of adaptive blades may incorporate flaps, slats, and active flow control. Such devices are driven by actuators disposed in the rotor blade. Whether such actuators are electrical, hydraulic, or other types of actuators, a certain amount of cooling is necessary for continued performance of the actuators. Typical cooling systems are complex, heavy, and prone to failure.

BRIEF DESCRIPTION OF THE INVENTION

A rotor blade for a rotary wing aircraft includes a component bay located substantially enclosed in the rotor blade and one or more components positioned in the component bay. An airflow inlet is located at the inboard side of the component bay and an airflow outlet is located at the component bay radially outboard of the airflow inlet. The airflow inlet and airflow outlet allow a continuous airflow through the component bay via centrifugal forces of rotation of the rotor blade, the continuous airflow cooling one or more components disposed at the component bay.

A method of cooling a component of a rotor blade includes rotating a rotor blade about a rotor shaft and urging air in a component bay out of the component bay through an airflow outlet via centrifugal forces of the rotor blade rotation. An airflow is urged into the component bay via an airflow inlet disposed radially inboard of the airflow outlet and the airflow is flowed past a component disposed in the component bay thereby removing thermal energy from the component.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a plan view of an embodiment of a rotor blade;

FIG. 3 is a cross-sectional view of an airflow outlet opening for an embodiment of a rotor blade.

The detailed description explains embodiments of the invention, together with advantages and features, by way of example with reference to the drawings.

DETAILED DESCRIPTION OF THE INVENTION

Figure 1:
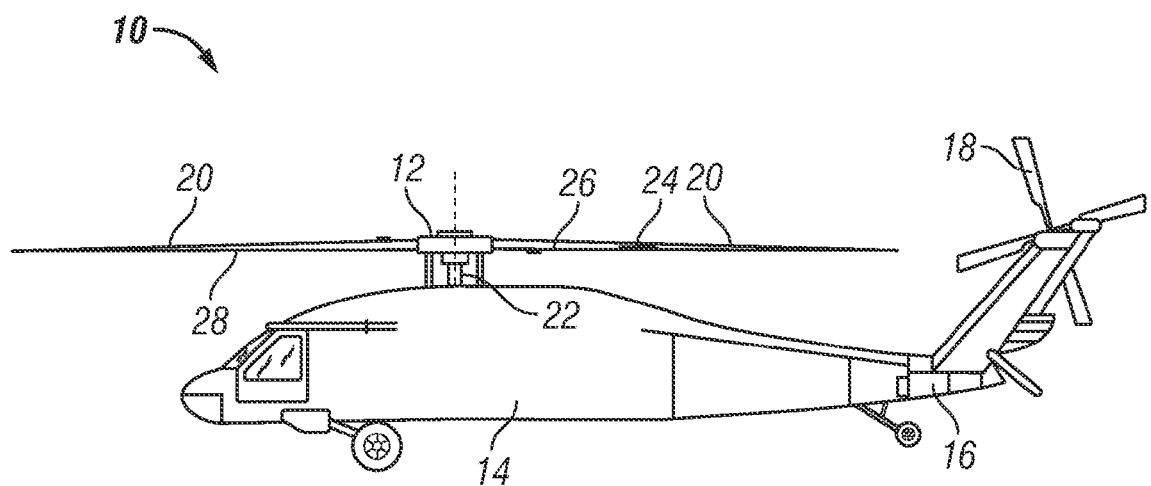
FIG. 1 is schematic illustration of an embodiment of a rotary wing aircraft.

Shown in FIG. 1 is a schematic illustration of a rotary wing aircraft 10 having a main rotor assembly 12. The aircraft 10 includes an airframe 14 having an extended tail 16 at which is mounted an anti-torque rotor 18. Although the configuration illustrated is a single main rotor helicopter, it is to be appreciated that other machines such as twin rotor helicopters, turbo-props, and tilt-rotor aircraft, and other aircraft with props or rotors will also benefit from the system of the present disclosure. The main rotor assembly 12 includes a plurality of rotor blades 20 located about a rotor shaft 22. One or more of the rotor blades 20 includes a control surface such as a trim tab 24 located at a trailing edge 26 of the rotor blade 20. While the control surface shown in FIG. 1 is a trim tab 24, it is to be appreciated that other types of on-blade control surfaces, such as conformal flaps, active flow control devices, unsteady and/or steady blowing devices, flaps, mass displacement devices, etc., are contemplated within the scope of the present disclosure. Further, while the trim tab 24 is shown located at the trailing edge 26 of the rotor blade 20, it is to be appreciated that the control surface may be disposed in other locations, for example, a leading edge 28 of the rotor blade 20.

Referring now to FIG. 2, the trim tab 24 or other control surface or component is driven by an actuator 30 located at the rotor blade 20. The actuator 30 is located in an actuator bay 32 within the rotor blade 20. A lower surface flush inlet opening 34 is formed through a skin 36 of the rotor blade 20 into the actuator bay 32. Similarly, a flush outlet opening 38 is formed through the skin 36 into the actuator bay 32. The inlet opening 34 and the outlet opening 38 are arranged such that the inlet opening 34 is located at a higher pressure area of the rotor blade 20 than is the outlet opening 38. For example, the inlet opening 34 may be located further inboard relative to the rotor shaft 22 and closer to the leading edge 28 of the rotor blade 20, while the outlet opening 38 is located relatively outboard and closer to the trailing edge 26 of the rotor blade 20. In some embodiments, as shown in FIG. 3, the actuator bay 32 may include a ramp 40 extending toward the outlet opening 38 to guide airflow through the outlet opening 38.

Referring again to FIG. 2, when the rotor blade 20 begins to rotate during operation of the aircraft 10, air inside the actuator bay 32 is forced toward an outboard side 42 of the actuator bay 32 via centrifugal forces, and out of the outlet opening 38. The pressure reduction in the actuator bay 32 due to exit of the air through the outlet opening 38 draws an airflow 44 into the actuator bay 32 which sets up a continuous airflow 44 through the actuator bay 32 when the rotor blade 20 is rotating. The airflow 44 centrifugally pumped through the actuator bay 32 via rotation of the rotor blade 20 provides cooling for the actuator 30 located therein. For example, a 0.25 inch diameter inlet opening 34 and outlet opening 38 are sufficient to cool an approximately 200 watt electric actuator. It is to be appreciated that while airflow is described herein as cooling an actuator 30 located in the rotor blade 20, this cooling scheme may be utilized to cool various other components in the rotor blade 20 that require cooling, for example, radar components, sensors, or the like.

The inlet opening 34 and outlet opening 38 are flush to the skin 36 of the rotor blade 20 to reduce the potential for foreign object damage and/or ingestion of debris into the actuator bay 32. To further increase foreign object protection, screens or filters may be utilized at the inlet opening 34 and the outlet opening 36.

Figure 4:
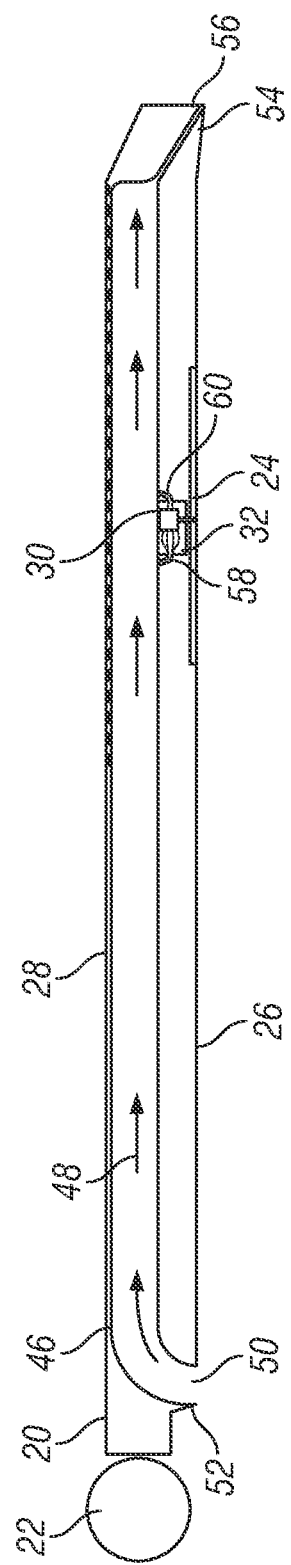
FIG. 4 is a plan view of another embodiment of a rotor blade.

Another embodiment is shown in FIG. 4. The rotor blade 20 of FIG. 4 includes a spar 46 through which a spar airflow 48 is centrifugally urged from a spar inlet 50 at an inboard end 52 of the rotor blade to a spar outlet 54 at, for example, a blade tip 56. The actuator bay 32 is connected to the spar 46 via an inlet passage 58 and an outlet passage 60. The high pressure spar airflow 48 as the rotor blade 20 is rotated is urged through the spar 46, and a portion of the spar airflow is diverted through the inlet passage 58 into the actuator bay 32. Thermal energy is transferred from the actuator 30 to the spar airflow 48 thus cooling the actuator 30. The diverted spar airflow 48 exits the actuator bay 32 via the outlet passage 60 and rejoins the main spar airflow 48 in the spar 46 until the spar airflow 48 is ejected from the rotor blade 20 at the spar outlet 54.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade for a rotary wing aircraft comprising:
a component bay disposed substantially enclosed in the rotor blade;
one or more electric actuators disposed in the component bay and operably connected to a control surface of the rotor blade to drive motion of the control surface;
an airflow inlet disposed at the component bay; and
an airflow outlet disposed at the component bay radially outboard of the airflow inlet, the airflow inlet and airflow outlet configured to urge a continuous airflow through the component bay via centrifugal forces of rotation of the rotor blade, the continuous airflow configured to cool the one or more electric actuators at the component bay.

2. The rotor blade of claim 1, wherein at least one of the airflow inlet and the airflow outlet extend through a skin of the rotor blade.

3. The rotor blade of claim 2, wherein the airflow inlet is substantially flush to the skin of the rotor blade.

4. The rotor blade of claim 2, wherein the component bay includes a ramp to guide the airflow through the airflow outlet.

5. The rotor blade of claim 1, wherein the airflow inlet is disposed closer to a leading edge of the rotor blade relative to the airflow outlet.

6. The rotor blade of claim 1, wherein at least one of the airflow inlet and the airflow outlet are in flow communication with an airflow spar extending through the rotor blade.

7. The rotor blade of claim 6, wherein both the airflow inlet and the airflow outlet are in flow communication with the airflow spar.

8. The rotor blade of claim 6, wherein the airflow spar extends from a spar inlet at an inboard end of the rotor blade to a spar outlet at a tip of the rotor blade.

9. A method of cooling an electric actuator of a rotor blade comprising:
rotating a rotor blade about a rotor shaft;
urging air in a component bay out of the component bay through an airflow outlet via centrifugal forces of the rotor blade rotation;
urging an airflow into the component bay via an airflow inlet disposed radially inboard of the airflow outlet;
flowing the airflow past the electric actuator disposed in the component bay thereby removing thermal energy from the component, the electric actuator operably connected to a control surface of the rotor blade to drive motion of the control surface; and
cooling the electric actuator via the airflow past the electric actuator.

10. The method of claim 9, further comprising flowing the airflow through the airflow outlet extending through a skin of the rotor blade.

11. The method of claim 9, wherein the airflow inlet extends from a skin of the rotor blade to the component bay.

12. The method of claim 9, further comprising:
urging the airflow into an airflow spar of the rotor blade;
urging the airflow from the airflow spar into the component bay via the airflow inlet; and
urging the airflow from the component bay into the airflow spar via the airflow outlet.

13. The method of claim 12, further comprising urging the airflow into the airflow spar of the rotor blade at an inboard end of the rotor blade.

14. The method of claim 12, further comprising urging the airflow ejecting the airflow from the airflow spar at a rotor blade tip.

15. A rotary winged aircraft comprising:
an airframe; and
a main rotor assembly operably connected to the airframe including a plurality of rotor blades, each rotor blade having:
a component bay disposed substantially enclosed in the rotor blade;
one or more electric actuators disposed in the component bay, the electric actuators operably connected to a control surface of the rotor blade to drive motion of the control surface;
an airflow inlet disposed at the component bay; and
an airflow outlet disposed at the component bay radially outboard of the airflow inlet, the airflow inlet and airflow outlet configured to urge a continuous airflow through the component bay via centrifugal forces of rotation of the rotor blade, the continuous airflow configured to cool the one or more electric actuators disposed at the component bay.

* * * * *